United States Patent
Hecht et al.

(10) Patent No.: US 11,827,095 B2
(45) Date of Patent: Nov. 28, 2023

(54) METHOD FOR PROVIDING A USER INTERFACE AND USER INTERFACE OF A TRANSPORTATION VEHICLE

(71) Applicant: VOLKSWAGEN AG, Wolfsburg (DE)

(72) Inventors: Denny Hecht, Eilsleben (DE); Sebastian Ehmann, Wolfenbüttel (DE)

(73) Assignee: Volkswagen AG

(*) Notice: Subject to any disclaimer, the term of this patent is extended or adjusted under 35 U.S.C. 154(b) by 106 days.

(21) Appl. No.: 16/703,032

(22) Filed: Dec. 4, 2019

(65) Prior Publication Data

US 2020/0180435 A1    Jun. 11, 2020

(30) Foreign Application Priority Data

Dec. 10, 2018 (DE) .................. 10 2018 221 352.6

(51) Int. Cl.
*B60K 35/00*    (2006.01)

(52) U.S. Cl.
CPC ........ *B60K 35/00* (2013.01); *B60K 2370/145* (2019.05); *B60K 2370/195* (2019.05); *B60K 2370/52* (2019.05); *B60K 2370/736* (2019.05)

(58) Field of Classification Search
None
See application file for complete search history.

(56) References Cited

U.S. PATENT DOCUMENTS

| | | | |
|---|---|---|---|
| 5,775,451 A | 7/1998 | Hull et al. | |
| 7,489,303 B1* | 2/2009 | Pryor | B60K 35/00 345/173 |
| 7,603,143 B2 | 10/2009 | Kang et al. | |
| 8,154,418 B2 | 4/2012 | Peterson et al. | |
| 8,406,961 B2* | 3/2013 | Pathak | G06F 3/03547 701/48 |
| 8,482,535 B2* | 7/2013 | Pryor | B60K 37/06 345/173 |
| 8,576,199 B1* | 11/2013 | Pryor | G06F 3/0425 345/175 |
| 9,063,644 B2* | 6/2015 | Zeng | G06F 3/04847 |
| 9,098,244 B2* | 8/2015 | Roskind | G06F 3/0426 |
| 9,513,744 B2* | 12/2016 | Pryor | B60K 37/06 |
| 9,778,831 B2* | 10/2017 | Penilla | G07C 5/008 |
| 9,829,979 B2* | 11/2017 | Brombach | G06F 3/016 |

(Continued)

FOREIGN PATENT DOCUMENTS

| | | |
|---|---|---|
| DE | 202013007366 U1 | 11/2014 |
| DE | 102015010376 A1 * | 2/2017 |

(Continued)

*Primary Examiner* — Mohamed Abou El Seoud
*Assistant Examiner* — Koorosh Nehchiri
(74) *Attorney, Agent, or Firm* — BARNES & THORNBURG, LLP

(57) ABSTRACT

A method for providing a user interface of a transportation vehicle, wherein the user interface has at least one mechanically adjustable controller and a touch display and operates peripheral devices of the transportation vehicle. A user interface of a transportation vehicle for performing the method for operating the at least one mechanically adjustable controller to bring about temporary deactivation of the touch display so that operation of peripheral devices by the touch display is temporarily blocked during the operation of the mechanically adjustable controller.

12 Claims, 2 Drawing Sheets

(56) References Cited

U.S. PATENT DOCUMENTS

| | | | |
|---|---|---|---|
| 2005/0057489 A1* | 3/2005 | Kung | G06F 1/1616 |
| | | | 345/156 |
| 2009/0267921 A1* | 10/2009 | Pryor | G06F 3/0416 |
| | | | 345/173 |
| 2010/0288567 A1 | 11/2010 | Bonne | |
| 2011/0037725 A1* | 2/2011 | Pryor | B60K 37/06 |
| | | | 345/173 |
| 2011/0316774 A1* | 12/2011 | Clifton | G06F 3/03547 |
| | | | 345/157 |
| 2013/0050094 A1* | 2/2013 | Rhee | G06F 3/04186 |
| | | | 345/168 |
| 2015/0378502 A1* | 12/2015 | Hu | G06F 3/04845 |
| | | | 345/173 |
| 2016/0077652 A1 | 3/2016 | Yang | |
| 2017/0024022 A1* | 1/2017 | Upmanue | G06F 3/0362 |
| 2017/0115826 A1* | 4/2017 | Pryor | B60R 1/00 |
| 2018/0088770 A1* | 3/2018 | Brombach | G06F 3/0482 |
| 2019/0039546 A1* | 2/2019 | Elangovan | G08B 21/24 |
| 2020/0019301 A1* | 1/2020 | Kolb | G06F 3/04883 |
| 2020/0277923 A1* | 9/2020 | Dixon | F02D 41/064 |

FOREIGN PATENT DOCUMENTS

| | | | |
|---|---|---|---|
| DE | 102015010376 A1 | | 2/2017 |
| JP | 2013218391 A | * | 10/2013 |
| WO | 2016016050 A1 | | 2/2016 |

* cited by examiner

METHOD FOR PROVIDING A USER INTERFACE AND USER INTERFACE OF A TRANSPORTATION VEHICLE

PRIORITY CLAIM

This patent application claims priority to German Patent Application No. 10 2018 221 352.6, filed 10 Dec. 2018, the disclosure of which is incorporated herein by reference in its entirety.

SUMMARY

Illustrative embodiments relate to a method for providing a user interface of a transportation vehicle, wherein the user interface has at least one mechanically adjustable controller and a touch display and is configured to operate peripheral devices of the transportation vehicle, and operating the at least one mechanically adjustable controller brings about temporary deactivation of the touch display, such that operation of peripheral devices by way of the touch display is temporarily blocked during the operation of the mechanically adjustable controller.

Illustrative embodiments furthermore relate to a user interface of a transportation vehicle for performing the method, wherein the user interface has at least one mechanically adjustable controller and a touch display and is configured to operate peripheral devices of the transportation vehicle.

BRIEF DESCRIPTION OF THE DRAWINGS

Disclosed embodiments are described below with reference to the figures. In the figures.

DETAILED DESCRIPTION

Figure 1:
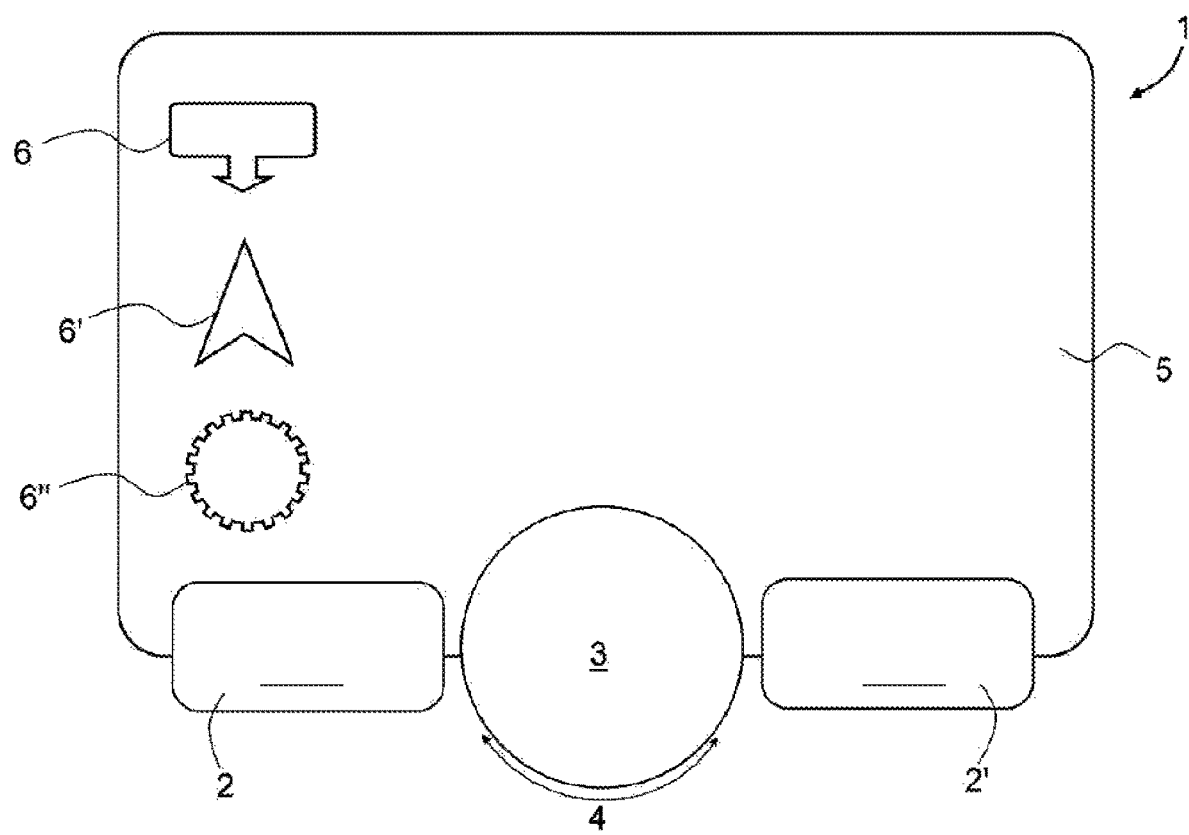
FIG. 1 shows a user interface.

Modern transportation vehicles have a wide variety of user interfaces by way of which various peripheral devices of the transportation vehicle, such as, for example, the infotainment system, the navigation device, the air conditioning system and many more, are able to be operated. Due to the extensive setting options, many peripheral devices are operated by a shared touch display that is generally arranged on the dashboard of the transportation vehicle. Mechanically adjustable controllers, which are often arranged in the immediate vicinity of the touch display, are nevertheless provided at the same time. Such mechanically adjustable controllers are used, for example, to adjust the volume of the infotainment system, the seat heating system and/or the hazard light system.

The peripheral devices are usually operated "blindly" by the driver, that is to say without looking directly at them, because the driver has to pay attention whilst driving on the road, thereby preventing a lengthier look at the user interface. When operating the mechanically adjustable controllers, it is not uncommon for the touch display to be inadvertently touched in the process, which may under some circumstances lead to unintentional adjustment of a peripheral device. Setting the previous configuration then often entails lengthier operation of the user interface and a corresponding distraction from the traffic.

A generic method and a generic device are described in DE 20 2013 007 366 U1. This describes a combined operating device for actuating at least one electrical apparatus, in particular, in a vehicle, with at least two input channels each for recording operational inputs. The combined operating device has a control apparatus coupled to the input channels and that is designed, in terms of the input channels, in response to an operational input on one of the input channels, to block the respective other input channel.

A method for operating a transportation vehicle using an operating device of the transportation vehicle that has a touch display is disclosed in DE 10 2015 010 376 A1.

US 2010/0288567 A1 discloses a vehicle having a touch display as user interface that is arranged directly on the steering wheel and that is deactivated when a predefined steering wheel turning angle is exceeded, as a result of which inadvertently touching the touch display when driving around corners does not lead to a peripheral device being adjusted. When the vehicle is driving in a straight line, the problem however still exists that inadvertently touching the touch display may lead to undesired adjustment of a peripheral device.

The method described in WO 2016/016050 is restricted to operating the lighting function of a transportation vehicle headlight, wherein some setting options are deactivated depending on predetermined criteria.

Resistive touch displays are also known, these being able, whenever the touch display is touched, to establish the pressure exerted thereon, which makes it possible to distinguish between a desired and an inadvertent input. Such resistive touch displays are however comparatively cost-intensive and are only able to be installed in pre-existing transportation vehicles with labor-intensive outlay.

Based on this, the disclosed embodiments create a method for providing a user interface that overcomes the drawbacks of the prior art, avoids inadvertent erroneous operation and increases road safety. It is also the intention to specify a user interface for performing the method.

Disclosed embodiments provide a method and a user interface. In the context of the disclosed method and of the disclosed device, there is provision to revoke an operation performed on a peripheral device via the touch display and to reinstate the previous state of the actuated peripheral device if the at least one mechanically adjustable controller is operated within a predefinable time period following operation of the touch display.

By virtue of the disclosed method and by virtue of the disclosed device, an inadvertent adjustment of peripheral devices is initially avoided if the touch display is inadvertently touched while operating a mechanically adjustable controller. The disclosed method is able to be installed even on previously installed user interfaces by way of a corresponding software update such that transportation vehicles already on the market are able to be retrofitted accordingly. The disclosure furthermore affords the benefit that it is thereby possible to dispense with comparatively cost-intensive resistive touch displays. The disclosure furthermore takes account of the observation that, even before operating the mechanically adjustable controller, inadvertently touching the touch display may entail an associated undesired change of settings on a peripheral device, this effectively being prevented thereby.

Exemplary embodiments are specified below.

The touch display may be inadvertently operated not only while operating the mechanically adjustable controller but also when looking for or feeling for the mechanically adjustable controller and/or when moving one's hand away after the control operation has been performed.

According to a first disclosed embodiment, there is therefore provision for the touch display to be activated following the operation of the mechanically adjustable controller, wherein the touch display may be activated following a predefinable delay. The predefinable delay may be, for example, 0.5 s, 1 s or longer and has the effect firstly that inadvertently touching the touch display following the operation of the mechanically adjustable controller does not lead to any changes of settings on a peripheral device. Secondly, a situation whereby the touch display is already reactivated in the case of brief interruptions in the operation of the mechanically adjustable controller is avoided. This disclosed embodiment is beneficial, in particular, when the traffic situation requires operation of the user interface to be interrupted, and the operation is continued shortly thereafter.

Independently of this, there may be provision for the automatic deactivation of the touch display as described above to be able to be activated and deactivated by the operator.

The individual deactivation conditions are also able to be activated or deactivated by the operator by selecting predefinable time periods. If the predefinable delay T1 is set, for example, to 0 s, the touch display is deactivated only during operation of the mechanically adjustable controller. The predefinable time period T2 may likewise be set to 0 s, as a result of which changes of settings on the peripheral device are not automatically revoked if the touch display was operated before the mechanically adjustable controller was operated.

Finally, according to at least one disclosed embodiment, there is provision for the mechanically adjustable controller to be a rotary controller, slide controller, toggle switch or pressure switch. The present disclosure is however not restricted to this selection of mechanically adjustable controllers, and rather comprises any controllers that are mechanically adjustable.

Figure 2:
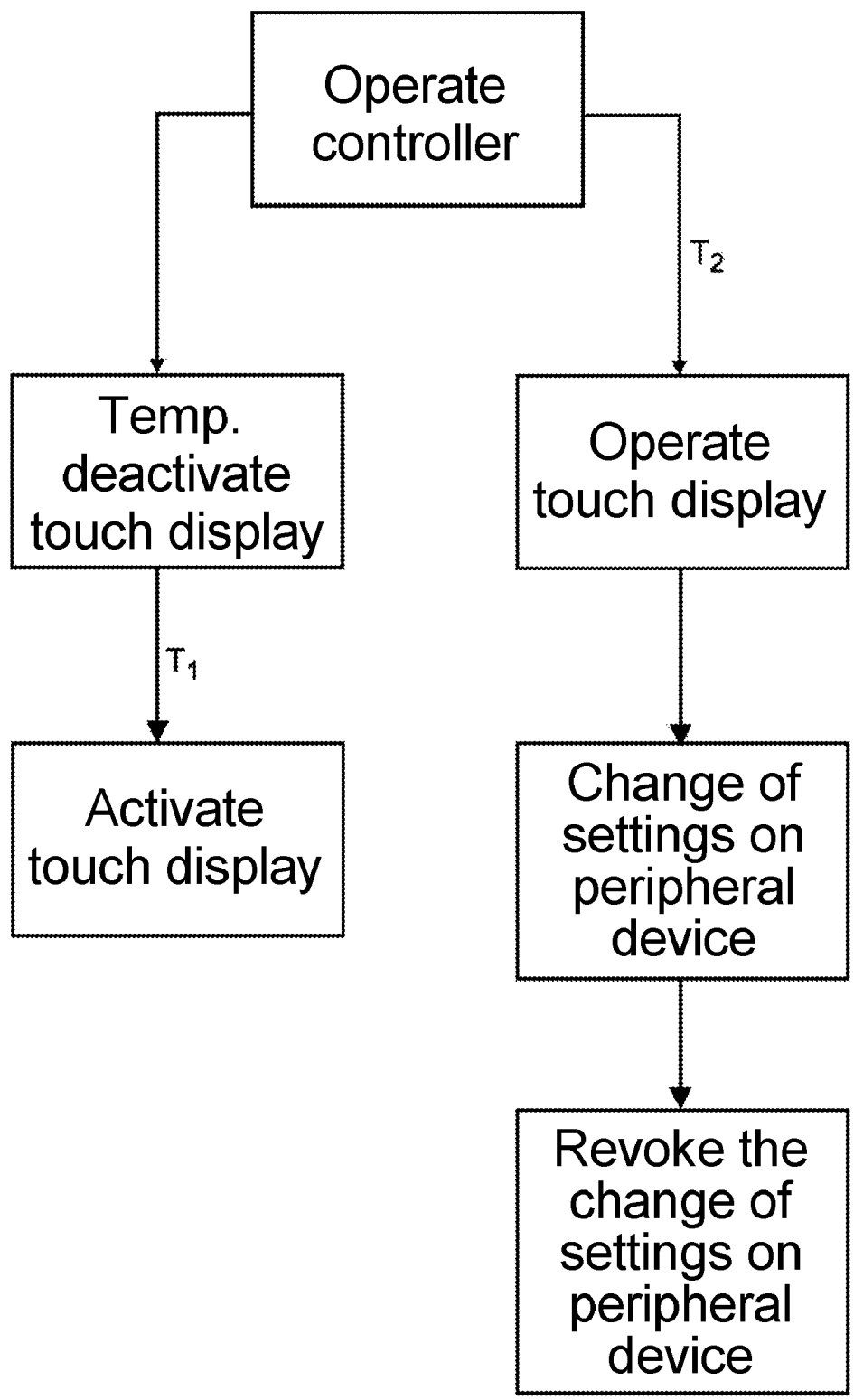
FIG. 2 shows a flowchart of the method.

FIG. 1 shows a user interface 1 as is normally arranged in transportation vehicles and by way of which it is possible to operate a variety of peripheral devices (not shown in detail). For this purpose, the user interface 1 that is illustrated by way of example has a plurality of mechanically adjustable controllers 2, 2', 3, namely two pressure switches 2, 2' and a rotary controller 3 that is able to be rotated in the direction of the arrow 4 and that is designed, for example, as a volume controller. Above the mechanically adjustable controllers 2, 2', 3 there is arranged a touch display 5 having a display and presentation surface on which there are displayed a plurality of icons 6, 6', 6'' for selecting and operating various peripheral devices and their settings. When operating the mechanically adjustable controllers 2, 2', 3, in particular, the rotary controller 3, it is not uncommon for the operator to touch the touch display 5, which may lead to undesired adjustment of a peripheral device. To prevent such erroneous operation, the user interface 1 is configured so as to perform the method illustrated in FIG. 2, according to which erroneous operation before, during and after the operation of a mechanically adjustable controller 2, 2', 3 is avoided.

According thereto, there is initially provision for the touch display 5 to be temporarily deactivated by operating a controller 2, 2', 3. At this time, it is not possible to change any settings of the peripheral devices on the touch display 5, as a result of which even inadvertent touching of the touch display 5 does not bring about any changes of settings. If a predefinable delay T1 has elapsed following the operation of a controller 2, 2', 3, the touch display 5 is activated (or reactivated) automatically, such that all of the functions of the user interface 1 are available again without restriction.

The method furthermore establishes whether the touch display 5 has been operated, with an associated change of settings on a peripheral device, within a predefinable time period T2 before the operation of a controller 2, 2', 3. In this case, the change of settings is revoked and the previous state is reinstated, such that even erroneous operation when looking for the controller 2, 2', 3 and before actuating it is prevented or is made immediately reversible.

LIST OF REFERENCE SIGNS

1 User interface
2 Pressure switch
3 Rotary controller
4 Direction of the arrow
5 Touch display
6, 6', 6'' Icon
$T_1$ Delay
$T_2$ Time period

The invention claimed is:

1. A user interface of a transportation vehicle, wherein the user interface comprises:
   at least one mechanically adjustable controller; and
   a touch display that operates peripheral devices of the transportation vehicle,
   wherein operating the at least one mechanically adjustable controller temporarily deactivates the touch display,
   wherein operation of peripheral devices by using the touch display is temporarily blocked during the operation of the mechanically adjustable controller,
   wherein, responsive to user actuation of the at least one mechanically adjustable controller performed within a predefinable time period, the predefinable time period defined as a period triggered upon user actuation of the touch display to conduct an operation performed on a peripheral device to change state via the touch display, the operation performed on the peripheral device to change state via the touch display is revoked from existence and the previous state of the peripheral device is reinstated.

2. The user interface of claim 1, wherein the touch display is activated following the operation of the mechanically adjustable controller responsive to expiration of the predefinable time period as a delay.

3. The user interface of claim 1, wherein the temporary deactivation of the touch display is able to be activated and deactivated.

4. The user interface of claim 1, wherein the mechanically adjustable controller is a rotary controller, slide controller, toggle switch or pressure switch.

5. A method for providing a user interface of a transportation vehicle, wherein the user interface comprises at least one mechanically adjustable controller and a touch display, the method comprising:
   operating peripheral devices of the transportation vehicle via the touch display;
   operating the at least one mechanically adjustable controller to temporarily deactivate the touch display,
   wherein operation of peripheral devices via the touch display is temporarily blocked during the operation of the mechanically adjustable controller, and
   responsive to actuation of the at least one mechanically adjustable controller performed within a predefinable threshold time period, wherein the predefinable threshold time period is triggered upon user actuation of the touch display to conduct an operation performed on a peripheral device to change state via the touch display, revoking the operation performed on the peripheral device to change state via the touch display from existence and reinstating the previous state of the peripheral device.

6. The method of claim 5, wherein the touch display is activated following the operation of the mechanically adjustable controller, wherein the touch display is activated following the predefinable time period as a delay.

7. The method of claim 5, wherein the temporary deactivation of the touch display is able to be activated and deactivated.

8. The method of claim 5, wherein the mechanically adjustable controller is a rotary controller, slide controller, toggle switch or pressure switch.

9. A user interface system of a transportation vehicle, wherein the user interface system comprises:
at least one mechanically adjustable controller; and
a touch display,
wherein each of the at least one mechanically adjustable controller and the touch display are configured to operate at least one peripheral device, wherein operation of the mechanically adjustable controller temporarily blocks operation of the at least one peripheral device via the touch display,
wherein, responsive to user actuation of the at least one mechanically adjustable controller within a predefinable threshold time period following user operation of the at least one peripheral device to change state via the touch display, the operation of the peripheral device to change state via the touch display is revoked from existence and the previous state of the at least one peripheral device is reinstated.

10. The user interface system of claim 9, wherein the touch display is temporarily deactivated during operation of the at least one mechanically adjustable controller, and reactivated following user operation of the mechanically adjustable controller after the predefinable time period as a delay.

11. The user interface system of claim 10, wherein the temporary deactivation of the touch display is able to be activated and deactivated.

12. The user interface system of claim 9, wherein the mechanically adjustable controller includes at least one of a rotary controller, slide controller, toggle switch, and pressure switch.

* * * * *